(12) United States Patent
Timpany

(10) Patent No.: US 9,512,021 B2
(45) Date of Patent: Dec. 6, 2016

(54) MEMBRANE SYSTEM AND METHOD FOR TREATING SEWAGE AND WASTEWATER CAPABLE OF AUTOMATED REMOVAL/DESTRUCTION OF SCUM/FOAM WITH HIGH ENERGY EFFICIENCY, HIGH FLUX AND LOW OPERATION COSTS AND HAYING PROCESS CONVERSION METHOD FROM CONSTANT LEVEL CONTINUOUS BATCH REACTOR PROCESS

(71) Applicants: Peter L. Timpany, Calgary (CA); ROTHWELL WATERTECH GLOCAL INCORPORATED, Seoul (KR)

(72) Inventor: Peter L. Timpany, Calgary (CA)

(73) Assignees: Peter L. Timpany, Calgary (CA); ROTHWELL WATERTECH GLOCAL INCORPORATED, Seoul (KR)

( * ) Notice: Subject to any disclaimer, the term of this patent is extended or adjusted under 35 U.S.C. 154(b) by 27 days.

(21) Appl. No.: 14/406,320

(22) PCT Filed: Jun. 7, 2013

(86) PCT No.: PCT/KR2013/005042
§ 371 (c)(1),
(2) Date: Dec. 8, 2014

(87) PCT Pub. No.: WO2013/183965
PCT Pub. Date: Dec. 12, 2013

(65) Prior Publication Data
US 2015/0129492 A1    May 14, 2015

(30) Foreign Application Priority Data
Jun. 9, 2012    (KR) .................... 10-2012-0061837

(51) Int. Cl.
*C02F 3/30* (2006.01)
*C02F 3/12* (2006.01)

(52) U.S. Cl.
CPC .............. *C02F 3/308* (2013.01); *C02F 3/1263* (2013.01); *C02F 3/1273* (2013.01); *C02F 3/1268* (2013.01); *C02F 2203/006* (2013.01); *C02F 2301/046* (2013.01); *C02F 2303/12* (2013.01); *Y02W 10/15* (2015.05); *Y10T 29/49716* (2015.01)

(Continued)

(58) Field of Classification Search
CPC .... C02F 3/308; C02F 3/1263; C02F 3/1273; C02F 2203/006; C02F 3/1268; C02F 2303/12; C02F 2301/046; Y10T 29/49716; Y02W 10/15
USPC ....... 210/605, 621, 623, 630, 252, 259, 903, 210/906
See application file for complete search history.

(56) References Cited

U.S. PATENT DOCUMENTS

| 5,616,241 | A  | * | 4/1997 | Khudenko | .............. C02F 3/006 210/151 |
|---|---|---|---|---|---|
| 2006/0169636 | A1 | * | 8/2006 | Devine | .................. B01D 61/16 210/605 |
| 2008/0277340 | A1 |  | 11/2008 | Hong et al. | |
| 2009/0218299 | A1 |  | 9/2009 | Cote et al. | |
| 2010/0276363 | A1 |  | 11/2010 | Hoyland | |
| 2012/0012524 | A1 | * | 1/2012 | Yang | ..................... C02F 3/1268 210/603 |

FOREIGN PATENT DOCUMENTS

| KR | 20-0188801 | 5/2000 |
|---|---|---|
| KR | 10-0872863 | 12/2008 |

* cited by examiner

*Primary Examiner* — Fred Prince
(74) *Attorney, Agent, or Firm* — Lex IP Meister, PLLC

(57) ABSTRACT

Disclosed are a sewage and wastewater treatment system and method using a constant level continuous flow sequencing batch reactor (CSBR). Also, disclosed is a method capable of converting the system into a membrane bioreactor (MBR) process by means of submerged membranes with a simple configuration. Further, disclosed is an automated foam and scum management and removal system.

14 Claims, 6 Drawing Sheets

MEMBRANE SYSTEM AND METHOD FOR TREATING SEWAGE AND WASTEWATER CAPABLE OF AUTOMATED REMOVAL/DESTRUCTION OF SCUM/FOAM WITH HIGH ENERGY EFFICIENCY, HIGH FLUX AND LOW OPERATION COSTS AND HAYING PROCESS CONVERSION METHOD FROM CONSTANT LEVEL CONTINUOUS BATCH REACTOR PROCESS

TECHNICAL FIELD

The present invention relates to a wastewater treatment system and, more particularly, to a wastewater treatment system and method for removing contaminants from sewage and wastewater through an advanced biological treatment process using a constant level continuous flow sequencing batch reactor (CSBR™), and a process conversion method of the system into a membrane bioreactor with high energy efficiency, high flow capacity, low operating cost, and automated scum/foam removal/destruction.

BACKGROUND ART

Contaminants, contained in sewage and wastewater, are generally classified into organic matters and nitrogen/phosphorous as nutrient salts.

Particularly, when untreated nitrogen and phosphorous as nutrient salts are discharged to rivers, eutrophication may be caused, and red tides may occur in oceans. To address these issues, advanced biological treatment processes for treating nitrogen and phosphorous are introduced.

For example, a nitrogen removing process as one of advanced biological treatment processes is divided into nitrification for converting organic nitrogen or ammoniacal nitrogen in sewage/wastewater into nitrate nitrogen in an anoxic state, and denitrification for converting the nitrate nitrogen generated through the nitrification into nitrogen gas in an anaerobic state. Nitrogen is removed from the sewage/wastewater through the nitrification and the denitrification.

Examples of such a nitrogen removing process include a Wuhman process, a Ludzack-Ettinger process, a Bardenpho process, a packed bed denitrification reactor process, an intermittent aeration activated sludge process, a sequencing batch reactor (SBR) process, and an oxidation ditch process.

In a phosphorous removing process, organic phosphorous is accumulated in the form of phosphate within cells in an aerobic state, and is discharged in the form of phosphate from microorganisms in an anaerobic state.

The discharged phosphate is excessively absorbed and accumulated in microorganisms in an aerobic state, and then, the microorganisms are discharged as waste activated sludge, thereby removing phosphorous from sewage/wastewater. Examples of such a phosphorous removing process include A/O, A2/O, UCT, and VIP.

Unlike the variable level sequencing batch reactor (SBR) process in which treating target water is successively introduced and discharged, a constant level sequencing batch reactor (CSBR™) process maintained at a constant level has been recently used to remove contaminants from sewage/wastewater. This CSBR process is disclosed, for example, in U.S. Pat. No. 5,902,484. In the CSBR process as an advanced biological treatment process, an anoxic tank, an anaerobic tank, an aerobic tank, and an aerobic settling tank are basically used to remove nitrogen and phosphorous from sewage/wastewater.

In a typical biological sewage treatment process, the quality of treated water greatly depends on solid-liquid separation efficiency in a settling reservoir. That is, microorganisms take in organic matters and nutrient salts from sewage/wastewater within an aerobic biological reactor, and are grown, and the grown microorganisms are deposited in the form of sludge in a gravity settling reservoir, and are separated and removed from water. By the way, when settling efficiency is decreased according to operating conditions in a treatment process, the quality of discharged water may be degraded.

Meanwhile, a separation membrane technology for treating sewage/wastewater is constantly applied and expanded for the last twenty years, and is highly regarded as a reliable technology in sewage/wastewater recycling and advanced treatment fields. To address the above-described fundamental issues, a membrane bio reactor (MBR) process is introduced, which includes a filtering process using a separation membrane to replace a typical gravitational deposition process, and has advantages of a biological process and a separation membrane technology to compensate for disadvantages of a typical activated sludge process. Particularly, a submerged MBR process makes it possible to completely separate a solid and a liquid from each other and to obtain stable treated water, and thus, is steadily applied to a sewage treatment field, and performances thereof are improved.

Such a typical MBR process is disclosed in U.S. Pat. No. 5,192,456 that pertains to an activated sludge treating apparatus for treating wastewater, in which a plurality of KUBOTA filter membrane modules are vertically arranged in parallel at predetermined intervals within a treating tank, and treating target water stored in the treating tank is separated into solid and liquid by the filter membrane modules. In this US patent, secondary clarification by gravity settling is replaced with membrane separation. Other typical MBR processes and systems use bundled hollow fiber membranes such as GE (Zenon) or Econity membranes and modules. In an MBR plant for biologically removing nitrogen, a separate anoxic process may be performed, and then, an aeration process as an MBR process may be performed. In this case, mixed liquor is recycled from the aeration process to the anoxic process, so that nitrate is provided in the anoxic process with a certain number of bacteria maintained. Accordingly, in the anoxic process, nitrogen gas is supplied with oxygen from the nitrate provided through the circulation with the microorganisms, and is discharged. Nitrification occurs in the aeration process (MBR process).

FIG. 1 is a schematic view showing a typical total MBR system according to the related art.

Referring to FIG. 1, wastewater is introduced into an anoxic mixed tank, successively flows into an aerobic tank, and is treated in a dedicated aerated membrane filtration tank. Nitrified sludge is recycled from the membrane filtration tank through a recycling line back to the mixed cell. An MBR aerated tank including a plurality of porous thin membranes or hollow fiber membranes are disposed within the aerated membrane tank. Treated water purified through solid-liquid separation in the MBR is discharged, and waste sludge is discarded.

Since the typical MBR process today maintains a high mixed liquor suspended solid (MLSS) concentration up to 10,000 mg/L in aeration tanks and up to 18,000 mg/L in membrane tanks (WEF Manual of Practice No. 36), organic matter can be suitably treated in smaller bioreactors than required for suspended growth conventional activated sludge treatment systems. In addition, if a separation membrane corresponding to micro porous size is used, turbidity of treated water can be improved, and particulates such as colon bacilli can be efficiently removed, thereby improving the quality of treated water. Furthermore, since solids retention time (SRT) is typically high in MBRs (15 days or more), auto-oxidation of sludge may be achieved to somewhat reduce the production of waste sludge.

However, if an excessively high MLSS concentration is maintained in a MBR process reactor, the total phosphorous (TP) value of the treated effluent may rapidly increase. In addition, the MBR process includes a recycle operation from an aerobic tank to an anaerobic tank and an anoxic tank to remove nitrogen and phosphorous. In this case, if a large amount of dissolved oxygen and/or nitrate nitrogen is recycled, phosphorous removing efficiency can decrease. And if excessive dissolved oxygen is recycled to the anoxic tank, nitrogen removing efficiency can also decrease. Finally if high MLSS concentrations are maintained in a MBR process reactor, the aeration energy requirements can increase by 50 to 100% more than for conventional activated sludge processes. Considering that about 75% of MBR wastewater plant energy use is from aeration blowers (See WEF Manual of Practice No. 36), the major alpha factor reductions at high MLSS concentrations may cause MBR processes to have unsustainably high energy consumption. As a consequence it is essential when selecting suitable processes for staged upgrading planning in advance to MBR processes, that minimal increased MLSS concentrations should be planned and proven in advance before selecting suspended growth biological nutrient removal (BNR) processes that may require MBR upgrades to increase flow capacity and/or treated effluent quality in the future.

Meanwhile, U.S. Pat. No. 7,172,699 discloses an EIMCO wastewater treatment system for decreasing the volume of an aerobic tank. According to this patent, wastewater may be treated through nitrification/denitrification, aerobic, anoxic/ simultaneous nitrification/denitrification, and oxic stages, and the volume ratio among the four stages is about 65:10: 15:10 such that the volume of the aerobic tank is only 20% of the total wastewater system volume, thereby reducing aeration requirements.

To this end, a large site and a construction area are required. Moreover, additional process facilities for satisfying tighten effluent quality criteria are required or pre-existed construction systems should be demolished to convert to new MBR treatment facilities. Accordingly, a large site for the additional process facilities, and costs for building the new facilities are required making conversion to MBR Treatment capability not cost effective. It can be seen that conversion to MBR Treatment capability from suspended growth conventional activated sludge treatment systems can often be not cost effective. And even if it may be cost effective, conversion to MBR Treatment capability may be complex and require shutdown of the existing treatment plant and loss of treatment capacity for long periods while the conventional activated sludge treatment systems are converted to MBR Treatment systems.

RELATED ART DOCUMENTS

Patents (Patent 0001) Korean Registered Utility Model No. 20-0368799
(Patent 0002) U.S. Pat. No. 5,902,484
(Patent 0003) U.S. Pat. No. 7,172,699
(Patent 0004) U.S. Pat. No. 3,472,765
(Patent 0005) U.S. Pat. No. 5,104,535
(Patent 0006) U.S. Pat. No. 5,192,456
(Patent 0007) U.S. Pat. No. 7,108,721
(Patent 0008) U.S. Pat. No. 7,513,999
(Patent 0009) U.S. Pat. No. 8,017,014
(Patent 0010) U.S. Pat. No. 5,811,009
(Patent 0011) U.S. Pat. No. 6,723,244
(Patent 0012) U.S. Pat. No. 7,279,102
(Patent 0013) U.S. Pat. No. 7,435,340

Non-Patent Documents (Non-patent document 0001) WEF Manual of Practice No. 36

DISCLOSURE OF INVENTION

Technical Problem

The present invention is to provide a sewage and wastewater treatment system using CSBR™ and a process conversion method of the system that is adapted for a phased process conversion for satisfying effluent quality criteria, without interrupted operations during MBR conversion re-construction, and that has a simple structure which is easily adapted for a conversion to a membrane bio-reactor (MBR) process using submerged separation membranes, and to thereby increase treatment flow capacity by up to about 2 times.

Solution to Problem

A sewage and wastewater treatment system using CSBR™ according to an embodiment of the present invention includes i) an inner recycle tank; ii) an anoxic tank for removing nitrogen by using, as a substrate, both sewage/ wastewater introduced from an outside and inner recycle water introduced from the inner recycle tank; iii) an anaerobic tank for discharging phosphorous by using, as a substrate, organic matters of both sewage/wastewater introduced from the outside and water introduced from the anoxic tank, and for decomposing the organic matters; iv) a first aerobic tank for oxidizing and removing an organic matter from water introduced from the anaerobic tank, and performing a nitrification process on organic nitrogen and ammoniacal nitrogen; and v) two main reactor tanks disposed at both sides of a continuous inflow path extending from the inner recycle tank through the anoxic tank to the first aerobic tank and connected to the first aerobic tank, wherein vi) guide rails are disposed on both side inner walls of each of the main reactor tanks, and a partition whose both ends are slidably coupled to the guide rails is provided at each of the main reactor tanks.

Also, in the sewage and wastewater treatment system using CSBR™ according to an embodiment of the present invention, the inner recycle tank and each of the main reactor tanks may be connected to each other through a recycle line for recycling the inner recycle water.

In addition, in the sewage and wastewater treatment system using CSBR™ according to an embodiment of the present invention, each of the main reactor tanks may be divided into a first reactor chamber and a second reactor chamber based on the partition. In this case, the first reactor chamber may include a second aerobic tank connected to the first aerobic tank, and the second reactor chamber may include a membrane separator tank connected to the second aerobic tank and including a submerged separation membrane module.

Additionally, in the sewage and wastewater treatment system using CSBR™ according to an embodiment of the present invention, the inner recycle tank and the second reactor chamber may be connected to each other through a recycle line for recycling the inner recycle water.

Further, the sewage and wastewater treatment system using CSBR™ according to an embodiment of the present invention may further include a collection trough disposed at the second reactor chamber and having a hydraulic system for collecting scum, foam and recycled activated sludge and discharging the scum, the foam and the recycled activated sludge.

In the sewage and wastewater treatment system using CSBR™ according to an embodiment of the present invention, the submerged separation membrane module may include a separation membrane having a large pore size of about 10 μm or greater.

In the sewage and wastewater treatment system using CSBR™ according to an embodiment of the present invention, the submerged separation membrane module may include a separation membrane having a minute pore size smaller than about 0.4 μm.

Meanwhile, a process conversion method in a sewage and wastewater treatment system using CSBR™ according to an embodiment of the present invention may include (1) providing the sewage and wastewater treatment system using CSBR™, the system including the inner recycle tank, the anoxic tank, the anaerobic tank, the first aerobic tank, and the two main reactor tanks as described above; (2) installing the partition on the guide rails provided at both side inner walls of each of the main reactor tanks to divide each of the main reactor tanks into first and second reactor chambers; and (3) installing the submerged separation membrane modules at the second reactor chamber.

Also, in the process conversion method in a sewage and wastewater treatment system using CSBR™ according to an embodiment of the present invention, the submerged separation membrane module may include a separation membrane having a large pore size of about 10 μm or greater or a separation membrane having a minute pore size smaller than about 0.4 μm.

Additionally, in the process conversion method in a sewage and wastewater treatment system using CSBR™ according to an embodiment of the present invention, when the submerged separation membrane module including the separation membrane having the large pore size is installed, discharged water may satisfy water quality criteria that includes a biochemical oxygen demand (BOD) ranging from about 10 to 20 mg/L, a suspended solids (SS) ranging from about 10 to 20 mg/L, a total nitrogen amount ranging from about 20 to 60 mg/L, and a total phosphorous amount ranging from about 2 to 8 mg/L.

Additionally, in the process conversion method in a sewage and wastewater treatment system using CSBR™ according to an embodiment of the present invention, when the submerged separation membrane module including the separation membrane having the minute pore size is installed, discharged water may satisfy water quality criteria that includes a BOD ranging from 3 to 10 mg/L, an SS ranging from 1.0 to 1.5 mg/L, a total nitrogen amount ranging from about 5 to 20 mg/L, and a total phosphorous amount ranging from about 0.2 to 2 mg/L.

Meanwhile, a sewage and wastewater treatment system according to an embodiment of the present invention may use submerged separation membrane modules including separation membranes located in an essentially constant level aerated treatment tank having an air supply system installed therein and may include a scum/foam collection trough disposed at the constant level aerated treatment tank and including the hydraulic systems for simultaneously collecting scum, foam, and recycled activated sludge from the constant level aerated treatment tank and draining the scum, the foam, and the recycled activated sludge to a collection chamber; and a pumping system for recycling flows from the collection chamber to the influent tank.

In the sewage and wastewater treatment system, the pumping system may have coordinated timing and collection chamber level monitoring systems capable of converting the collection chamber into a variable level scum/foam destruction chamber to change a water level of a collection tank to allow rapid draining of the volume of the scum, foam, and recycled activated sludge from the scum/foam collection trough through flow control systems connected to the collection chamber.

Also, a sewage and wastewater treatment method according to an embodiment of the present invention may simultaneously and intermittently collect scum, foam, and recycled activated sludge from an aerated tank with submerged separation membrane modules, and deposit the scum, foam, and recycled activated sludge at a high level and velocity into a variable level scum/foam destruction chamber to allow the variable flow recycle pumps to transfer the recycled activated sludge to the influent tank.

In addition, a sewage and wastewater treatment system using submerged separation membrane modules having a mixed liquor suspended solids (MLSS) concentration required for achieving specified treatment efficiency for wastewater may be configured to receive inflow of waste activated sludge from a biological treatment system that does not use the submerged separation membrane modules and has similar specified treatment efficiency for the wastewater, and to transfer the waste activated sludge received from the biological treatment system to a biological treatment system using the submerged separation membrane modules so as to reduce solids retention time (SRT) and scum/foam growth risk of the biological treatment system.

Advantageous Effects of Invention

According to the present invention, by installing the partition on the guide rails of the main reactor that replaces a typical aerobic settling tank, the main reactor tanks may be divided into the second aerobic tank and the membrane separator tank.

Therefore, the present invention allows a phased process conversion without interrupted operations, and also realizes a simple structure which is easily adapted for a conversion to a CSBR-MBR process using submerged separation membranes.

Additionally, the present invention may replace the submerged separation membrane module with a separation membrane having a large pore size or a minute pore size, depending on water quality criteria of discharged water, in the membrane separator tank divided from the main reactor tank through the partition.

Namely, the present invention may allow a conversion to CSBR-MBR by installing a package of the submerged separation membrane modules on a path diverging from the first aerobic tank, may achieve sewage and wastewater treatment capacity by up to about 2 times in the same structure, and may reduce both operating cost and maintenance cost.

Unlike conventional technique to need stopping inflow of water, draining treated water from the reactor tank, amending and modifying facilities so as to use submerged separation membrane, the present invention allows non-interrupted operations for inflow water and does not require amending and modifying such facilities so as to use submerged separation membrane.

Namely, since the conversion to CSBR-MBR is allowed just by installing partitions without taking out treated water from the reactor tank and without amending and modifying the facilities, the present invention can reduce manpower and cost.

MODE FOR INVENTION

Reference will now be made in detail to the preferred embodiments of the present invention, examples of which are illustrated in the accompanying drawings. The present invention may, however, be embodied in different forms and should not be construed as limited to the embodiments set forth herein.

In describing the embodiments of the present invention, descriptions of items which are well known in the related art to which the present invention belongs and are not directly associated with the present invention may be omitted for clarity so as to clearly provide the present invention without departing from the scope of the present invention. Also, though terms like a first and a second are used to describe specific elements in the following description, the elements are not limited to these terms.

Figure 1:
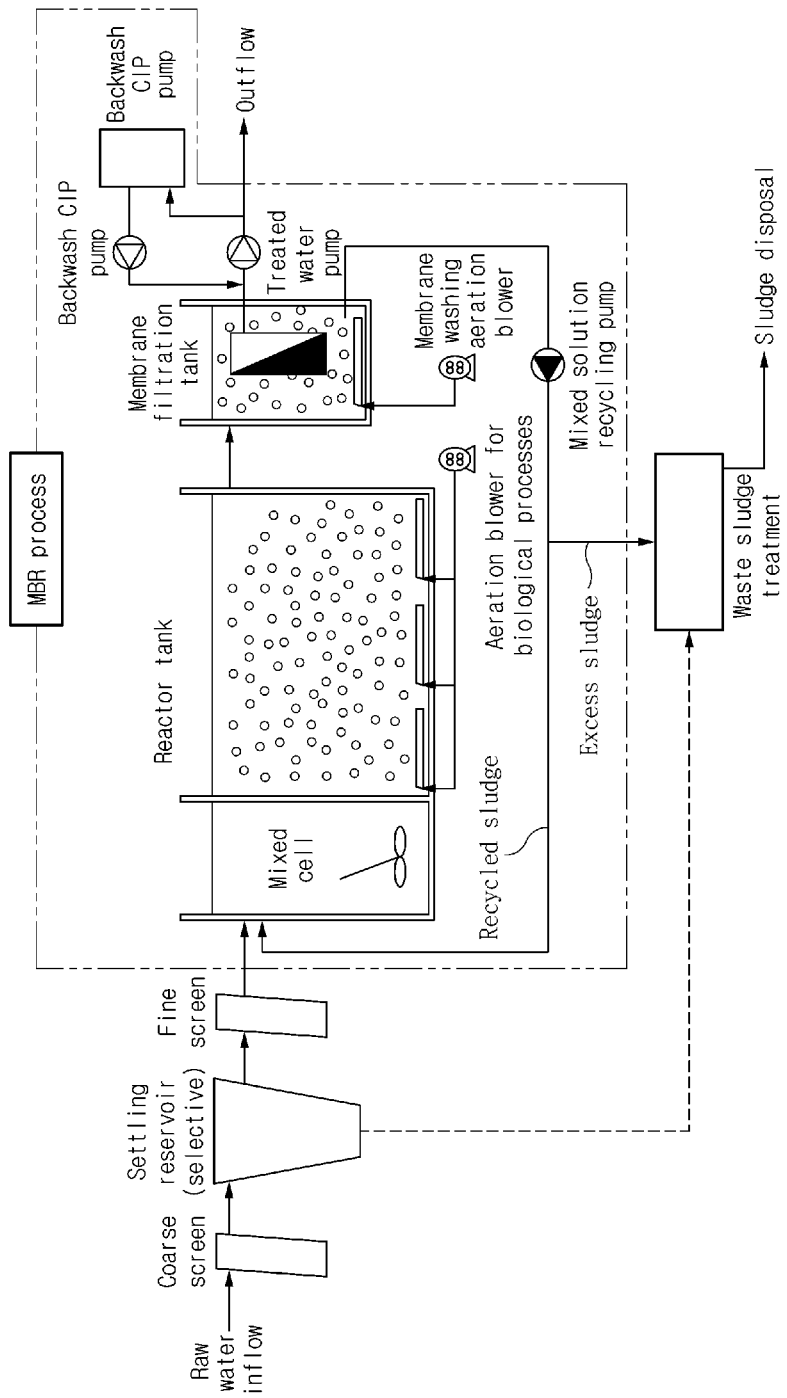
FIG. 1 is a schematic view illustrating a typical total MBR sewage and wastewater treatment system according to the related art.
Figure 2:
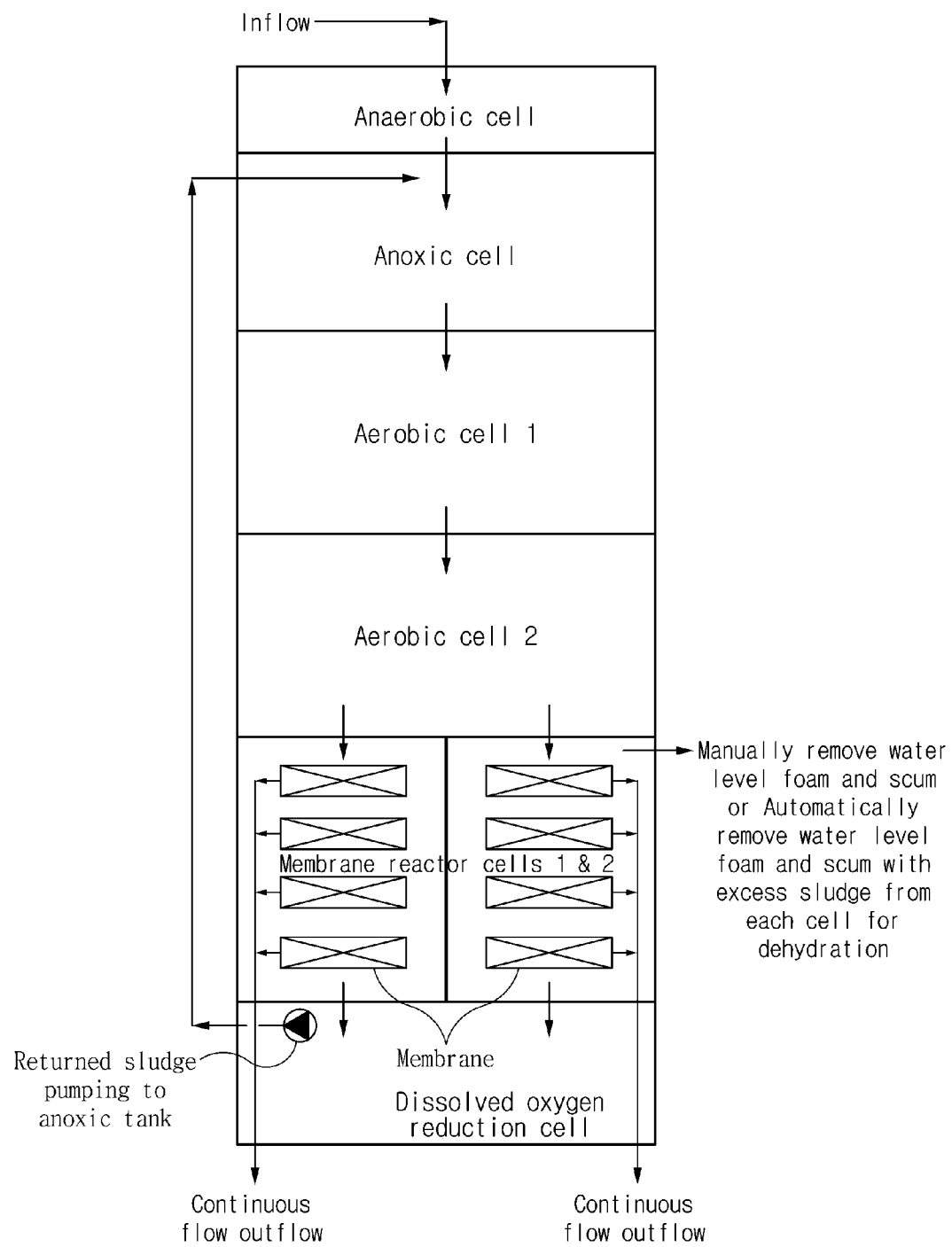
FIG. 2 is a schematic view illustrating a typical MBR sewage and wastewater treatment system including a scum/foam removal function.

FIG. 2 is a schematic view illustrating a typical MBR sewage and wastewater treatment system including a scum/foam removal function.

Referring to FIG. 2, top water level scum and foam can be manually removed or automatically removed, together with waste sludge, from each cell through open piping to sludge dewatering. MBR wastewater treatment systems easily produce excessive amounts of scum and foam with typically long solids retention time (SRT) easily obtained and multiple tanks in series.

Scum and foam production from MBR wastewater treatment systems have been reported to be up to 100% of the volume of waste sludge. As a result there is a high cost for scum and foam management systems at present and high energy and chemical cost as well for disposal and dewatering. In addition mechanical or floating scum and foam collection systems do not work effectively with pumps and are very inefficient and found to be ineffective regarding the capability to remove and destroy scum and foam faster than it can be produced.

Figure 3:
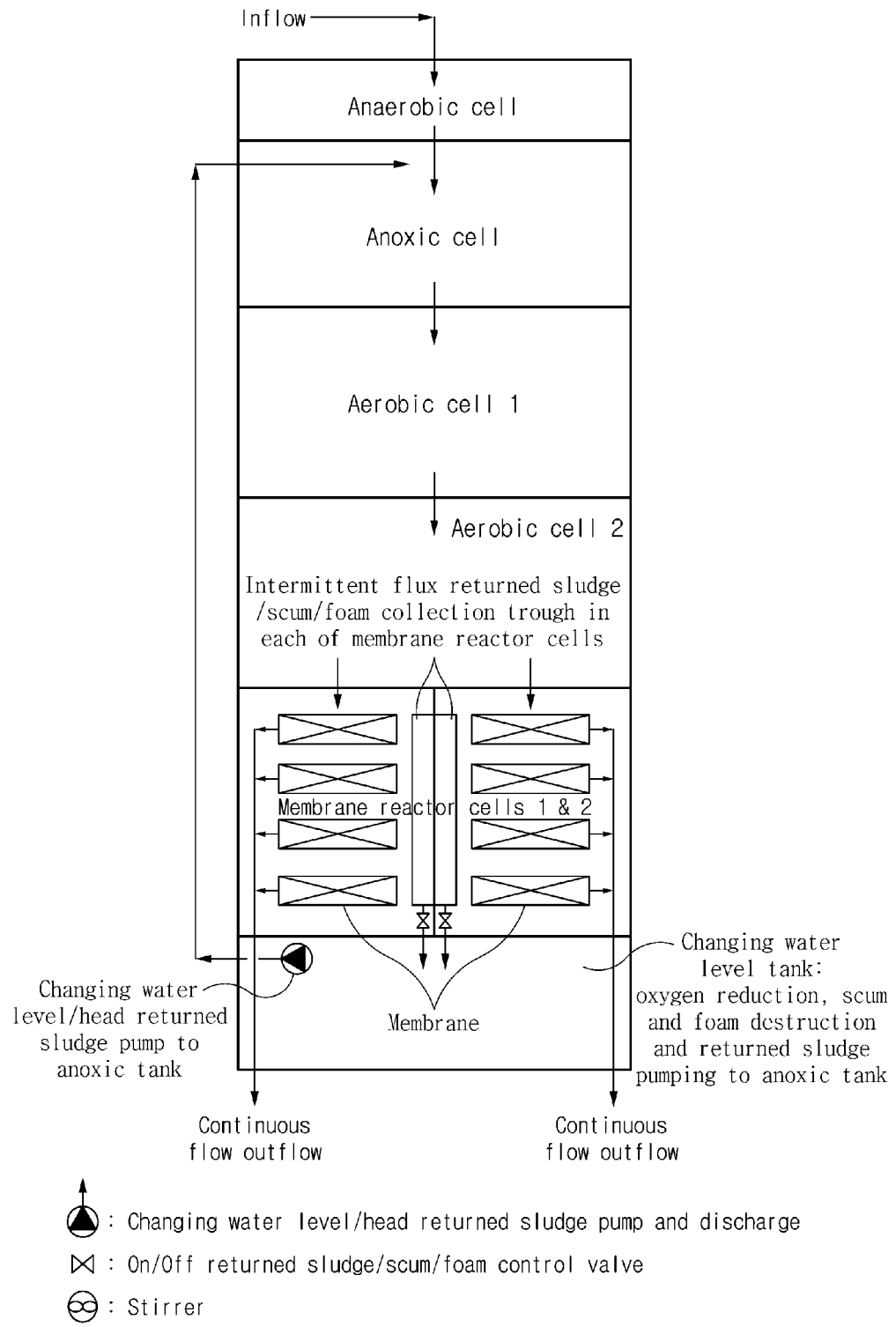
FIG. 3 is a schematic view illustrating a typical MBR sewage and wastewater treatment system including an automatic scum/foam removal system and method according to an embodiment of the present invention.

FIG. 3 is a schematic view illustrating a typical MBR sewage and wastewater treatment system including an automatic scum/foam removal system and method according to an embodiment of the present invention.

This embodiment of the present invention utilizes intermittent high flows even greater than the high return activated sludge (RAS) flow rates of typical MBR wastewater treatment systems to remove scum and foam and to achieve automated scum and foam destruction on a continuing basis 24 hours per day. Integrating a variable level RAS Chamber as shown in FIG. 3 allows intermittent very high flows to increase the collection rate of scum and foam as well as destruction of scum and foam and the required average RAS rate for managing the MLSS concentration in the MBR aeration tank. This system and method for scum and foam management also requires a constant or essentially constant level in the MBR aeration tank in order for the hydraulic system in the collection trough to effectively and simultaneously collect scum and foam and the required average RAS flows. Additionally the collection trough needs to be located on the length of the MBR aeration tank for scum and foam to be collected for each cycle. Variable rate pumping from the variable level RAS chamber and alternate ON/OFF scheduling of flows from different membrane reactor cells combine to allow this embodiment of the present invention to also effectively achieve deoxygenation of the RAS flow as well as scum and foam collection and destruction.

Figure 4:
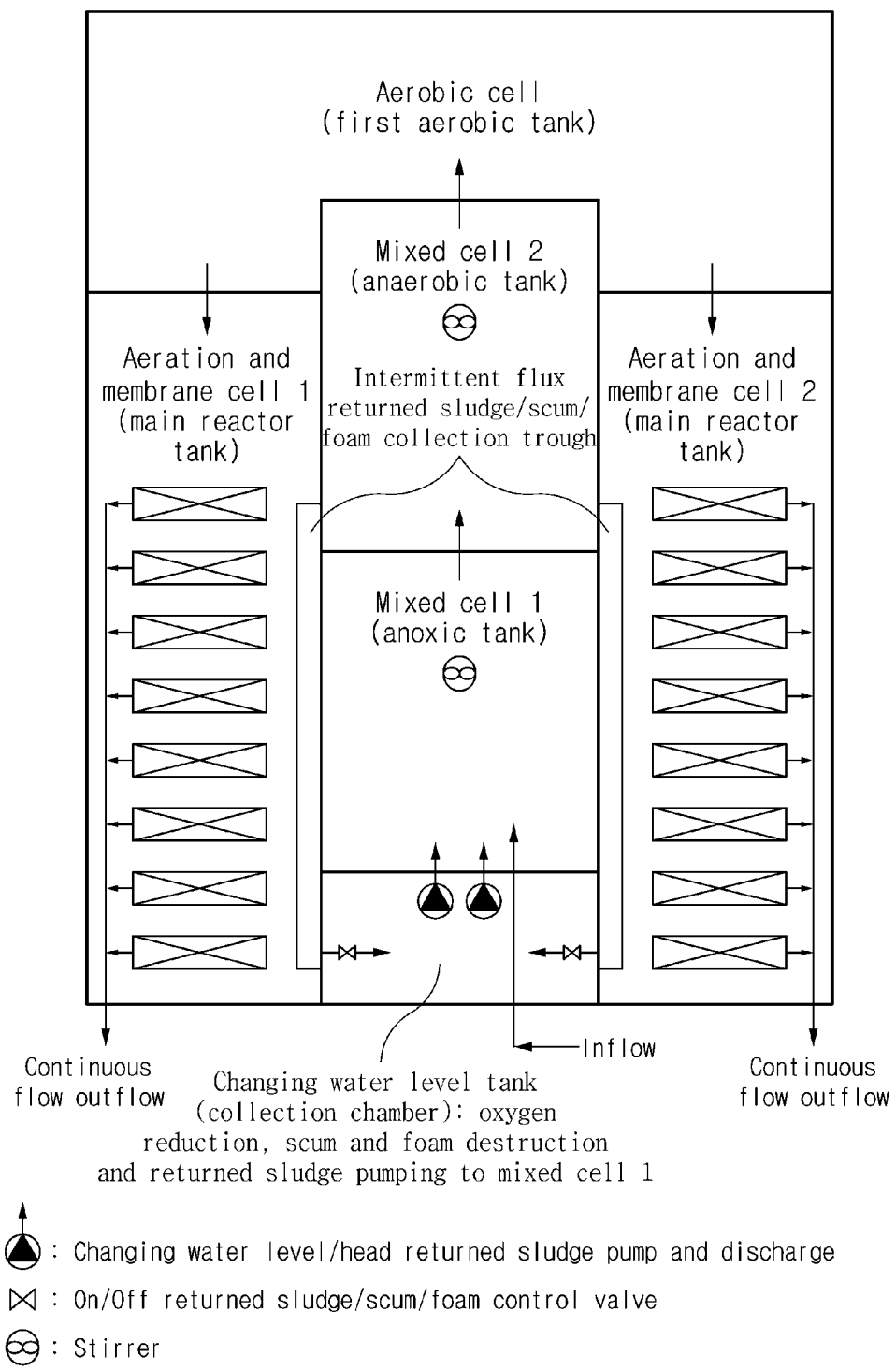
FIG. 4 is a schematic view illustrating a sewage and wastewater treatment system using CSBR™ and including an automatic scum/foam removal/management system and method according to an embodiment of the present invention.

FIG. 4 is a schematic view illustrating a sewage and wastewater treatment system using CSBR™ and including an automatic scum/foam removal/management system and method according to an embodiment of the present invention.

Referring to FIG. 4, a sewage and wastewater treatment system using CSBR™ according to the current embodiment also allows scum and foam collection and destruction and removes contaminants, such as organic matters and nitrogen/phosphorous as nutrient salts, from sewage and wastewater through an advanced biological treatment process.

For example, the sewage and wastewater treatment system may use a constant level sequencing batch reactor (CSBR™) process different from a typical sequencing batch reactor (SBR) process. Accordingly, treating target water is successively introduced and discharged, and is maintained at a constant level.

The CSBR™ process has advantages of a typical improved A2O process and an SBR process to stably remove nitrogen and phosphorous, and does not require a mechanical discharge facility and a secondary settling reservoir to minimize the area of a required site.

The sewage and wastewater treatment system according to this embodiment uses submerged separation membrane modules located in an essentially constant level aerated treatment tank having aeration system.

The aerated treatment tank is equipped with a scum and foam collection trough having a hydraulic system to simultaneously collect scum, foam, and recycled activated sludge and drain to a collection chamber (i.e., a recycle tank). Also, an adjusting valve is used to drain scum, foam, and recycled sludge collected from the collection trough to the collection chamber.

Meanwhile, the collection chamber is equipped with a pump that is used to allow the collection chamber to have a variable level. In case water level is lowered by the pump, the scum/foam collected from the collection trough can be rapidly transferred to the collection chamber, and a head drop caused at this time can destroy the scum/foam. Therefore, due to a change in level, the collection chamber can be converted into a scum/foam destruction chamber.

Additionally, the pump can transfer recycled sludge collected in the collection chamber to the first mixed cell (an anoxic tank).

Through this, it is possible to simultaneously and intermittently collect scum, foam, and recycled activated sludge from the aerated tank with the submerged separation membrane modules. It is also possible to deposit the scum, foam, and recycled activated sludge at a high level and velocity into a variable level scum/foam destruction chamber to allow the variable flow recycle pumps to transfer the recycled activated sludge to the influent tank.

Particularly, the sewage and wastewater treatment system using CSBR™ in an embodiment of this invention is adapted for a phased process conversion according to water quality criteria, through uninterrupted construction for sewage/wastewater, and has a simple structure adapted for a MBR process using a submerged separation membrane.

To this end, the sewage and wastewater treatment system using CSBR™ in an embodiment of this invention is configured to include an inner recycling tank (a collection chamber), an anoxic tank (a first mixed cell), an anaerobic tank (a second mixed cell), a first aerobic tank (an aerobic cell), and main reactor tanks (aerobic and membrane cells).

In this case, each tank is separated by a wall serially connected to the downstream tank, and water treated in each tank is transferred to the next tank through an overflow or direct top water connection as required for scum/foam management.

The inner variable level recycle tank stores treated water including sludge recycled from the main reactor tank, and supply the treated water to the anoxic tank. Raw water is supplied to the anoxic tank and the anaerobic tank.

Inner recycle water from the variable level inner recycle tank and raw water from the raw water inflow path are introduced to the anoxic tank that removes nitrogen from the introduced water as a substrate. An agitator for agitating the introduced water may be installed on the anoxic tank.

When water including organic matters is introduced from the anoxic tank and the raw water inflow path to the anaerobic tank, the anaerobic tank discharges phosphorous from the organic matters as a substrate, and decomposes the organic matters. An agitator for agitating the introduced water may be installed on the anaerobic tank.

The first aerobic tank oxidizes and removes organic matters from water introduced from the anaerobic tank, and performs a nitrification process on organic nitrogen and ammoniacal nitrogen.

Since the inner recycle tank, the anoxic tank, the anaerobic tank, and the first aerobic tank are well known in the art, a more detailed description thereof will be omitted.

Meanwhile, the main reactor tanks include reactor tanks that are disposed at both sides of a continuous inflow path of the inner recycle tank, the anoxic tank, the anaerobic tank, and the first aerobic tank, and are connected to the first aerobic tank.

The main reactor tank, as an aerobic settling tank in the CSBR process, performs a preliminary deposition process and a surplus sludge discharge process, and then, discharges finally treated water to the outside. A portion of the treated water including sludge is recycled from the main reactor tank to the inner recycle tank through a recycle line.

Figure 5:
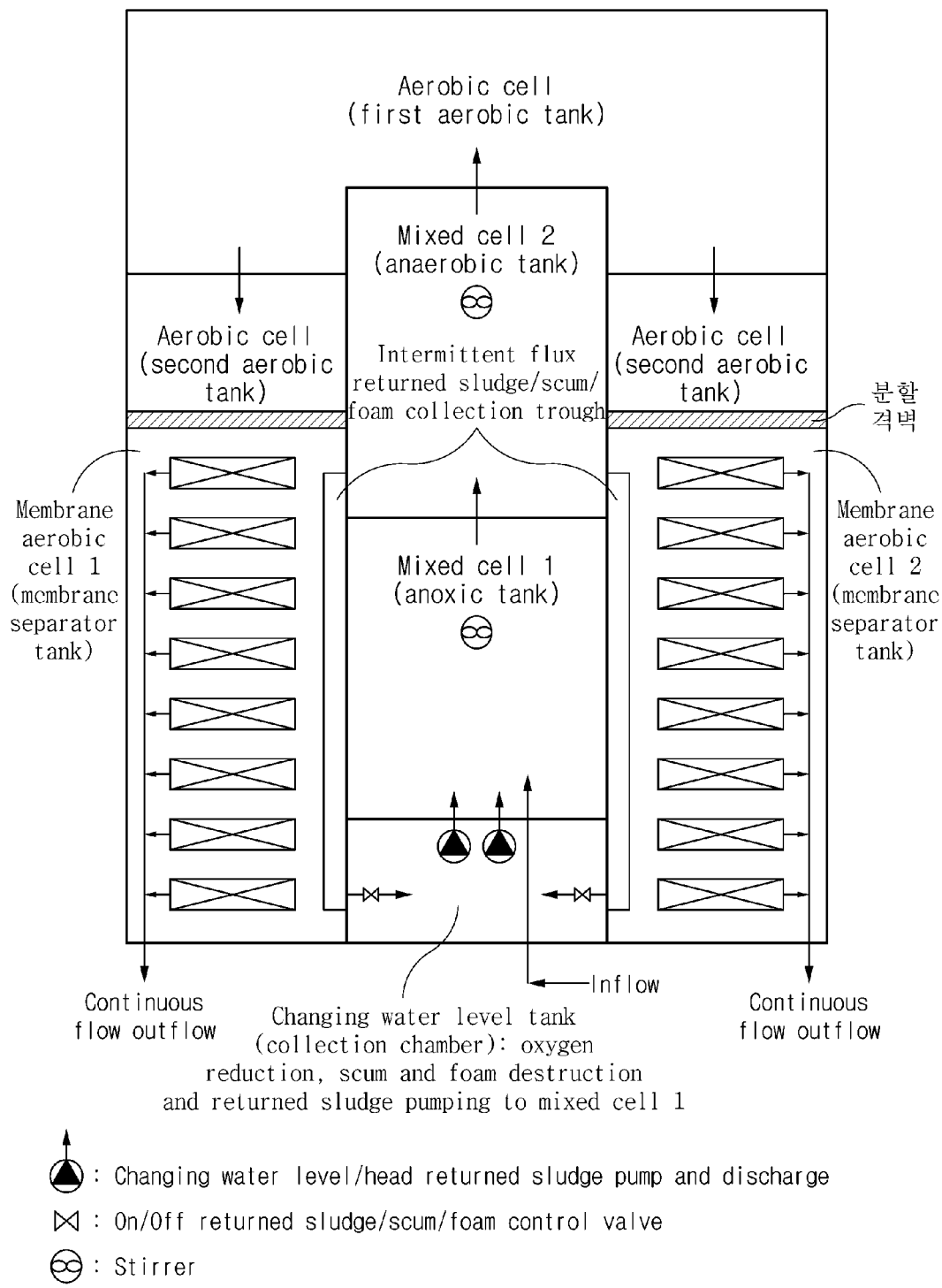
FIG. 5 is a schematic view illustrating a sewage and wastewater treatment system using CSBR™, employing a partition, and including an automatic scum/foam removal/management system and method according to an embodiment of the present invention.

FIG. 5 is a schematic view illustrating a sewage and wastewater treatment system using CSBR™, employing a partition, and including an automatic scum/foam removal/management system and method according to an embodiment of the present invention.

In an embodiment of the present invention, guide rails are installed at both side inner walls of the main reactor tank, and a partition is installed on the guide rails. The partition is disposed across each of the main reactor tanks, and both ends of the partition are slidably coupled to the guide rails.

Each of the main reactor tanks may be divided into first and second reactor chambers by further installing the partition on the guide rails as described above. In this case, the first reactor chamber may serve as the second aerobic tank, and the second reactor chamber may serve as the membrane separator tank. That is, when process conversion is needed according to the effluent quality criteria, a conversion to the CSBR-MBR process can be made just by installing partitions.

Meanwhile, since the guide rails may be provided in plurality on each inner wall of the main reactor tanks, the position of the partitions may be changed to vary the size of the membrane separator tanks as required.

The second aerobic tanks may be connected to the first aerobic tank discussed above. For example, the second aerobic tank may store water introduced through an overflow from the first aerobic tank, oxidize and remove organic matters from the introduced water, and perform a nitrification process on organic nitrogen and ammoniacal nitrogen.

The membrane separator tanks remove sludge from water introduced from the second aerobic tanks. Submerged separation membrane modules are disposed in the membrane separator tanks to substantially separate microorganism floc from water introduced from the second aerobic tanks.

Since the submerged separation membrane modules are submerged in treated water within the membrane separator tanks, the submerged separation membrane modules include separation membranes having micro pores. Water filtered by the submerged separation membrane modules is discharged as treated water.

The submerged separation membrane module may include separation membranes having a large pore size of about 10 µm or greater, or separation membranes having a minute pore size smaller than about 0.4 µm.

When the submerged separation membrane module including the separation membrane having the large pore size is installed, discharged water satisfies water quality criteria that includes a biochemical oxygen demand (BOD) ranging from about 10 to 20 mg/L, a suspended solids (SS) ranging from about 10 to 20 mg/L, a total nitrogen amount ranging from about 20 to 60 mg/L, and a total phosphorous amount ranging from about 2 to 8 mg/L. When the submerged separation membrane module including the separation membrane having the minute pore size is installed, discharged water satisfies water quality criteria that includes a BOD ranging from 3 to 10 mg/L, an SS ranging from 1.0 to 1.5 mg/L, a total nitrogen amount ranging from about 5 to 20 mg/L, and a total phosphorous amount ranging from about 0.2 to 2 mg/L.

Since such submerged separation membrane modules are well known in the art, a more detailed description thereof will be omitted.

Meanwhile, the membrane separator tank is connected to the variable level inner recycle tank through the recycle line, and a portion of treated water including sludge treated by the submerged separation membrane module is recycled to the inner recycle tank by the recycle pumps.

As described above, in the sewage and wastewater treatment system using the CSBR, the partition may installed on the guide rails disposed on both side inner walls of each of the main reactor tanks to divide each of the main reactor tanks into first and second reactor chambers and install the submerged separation membrane module in the second reactor chamber, thereby making a conversion to a CSBR-MBR process.

As such, since a CSBR-MBR process performs a denitrification operation on inner recycled water before an anaerobic tank, the CSBR-MBR process more efficiently removes phosphorous than a typical MBR process does. In addition, since the CSBR-MBR process can use activated sludge having higher concentration than that of a typical fixed CSBR process, target wastewater can be treated for a short time, thereby further simplifying a treatment process, and minimizing a treatment site. Accordingly, cost can be saved, and energy efficiency can be improved.

For the simple process conversion method of the sewage and wastewater treatment system using CSBR™ according to an embodiment of the present invention, a conversion to the CSBR-MBR process can be made just by installing partitions, without taking out treated water from a reactor tank, and amending and modifying the facilities, thereby reducing manpower and costs for the conversion to the CSBR-MBR process.

Figure 6:
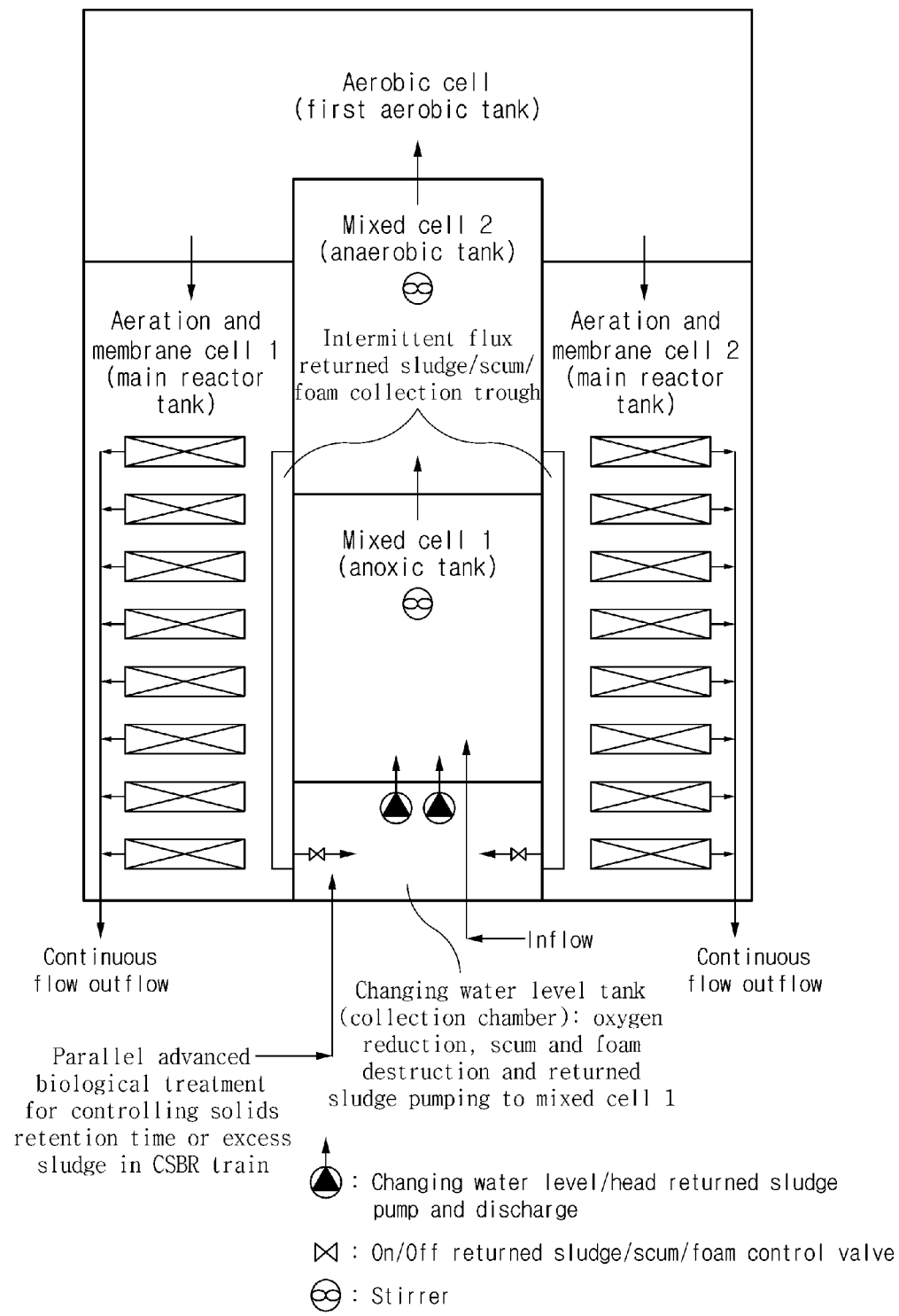
FIG. 6 is a schematic view illustrating a sewage and wastewater treatment system using CSBR™ according to an embodiment of the present invention when activated sludge is transferred from other adjacent biological treatment systems or CSBR™ treatment systems.

FIG. 6 is a schematic view illustrating a sewage and wastewater treatment system using CSBR™ according to an embodiment of the present invention when activated sludge is transferred from other adjacent biological treatment systems or CSBR systems. An embodiment as shown in FIG. 6 is to reduce SRT which hinders growth of nuisance foam-producing organisms without a change in the desired MLSS concentration.

Referring to FIG. 6, the sewage and wastewater treatment system according to an embodiment of the present invention is a biological treatment system having submerged separation membrane modules and has a desired MLSS concentration to achieve specified treatment efficiency required for the sewage and wastewater treatment system.

Under the condition of higher solids retention time (SRT), the sewage and wastewater treatment system using the submerged membrane modules may produce scum/foam causing excessive accumulation of metabolic byproduct and disturbing treatment thereof.

The sewage and wastewater treatment system according to an embodiment of the present invention includes systems for receiving waste activated sludge from other adjacent biological treatment systems or CSBR treatment systems that does not use the submerged separation membrane modules but has similar specified treatment performance. In this case, the adjacent treatment systems that do not use the submerged separation membrane modules may transfer waste activated sludge having the same or similar characteristics, thereby achieving major process and performance enhancement.

For the above, the sewage and wastewater treatment system collects, through a collecting system, waste activated sludge from other biological treatment system that does not use submerged separation membrane modules but has similar treatment efficiency of causing no scum/foam.

The collected waste activated sludge is transferred to the biological treatment system having the submerged separation membrane modules through a transferring system.

It is therefore possible to reduce the membrane biological treatment system SRT while simultaneously maintaining the needed MLSS concentration to achieve the necessary treatment efficiencies of the membrane biological treatment system.

Also, the reduction of the membrane biological treatment system process SRT may reduce the rate of growth of nuisance foam production organisms that can easily grow to excess for wastewater treatment system processes that use submerged separation membrane modules.

TABLE 1

Winter (13 deg C.) CMBR Process Assessment - High MLSS Concentration

| | | | CMBR | | | | |
|---|---|---|---|---|---|---|---|
| Parameter | Unit | CSBR (1 Train) | (1 Tr. Upgraded to full BNR Treatment) | (1 Tr. Upgraded + 25% WAS Transfer) | (1 Tr. Upgraded + 50% WAS Transfer) | (1 Tr. Upgraded + 100% WAS Transfer) | (1 Tr. Upgraded + 200% WAS Transfer) |
| Influent Flow | m³/day | 20.000 | 40.000 | 40.000 | 40.000 | 40.000 | 40.000 |
| HRT | hr | 19.0 | 9.5 | 9.5 | 9.4 | 9.3 | 9.2 |
| SRT | day | 15.0 | 11.8 | 9.2 | 7.5 | 5.5 | 3.6 |
| MLSS | mg/L Avg. (Max) | 3.500 (5.000) | 4.900 (5.800) | 4.900 (5.800) | 4.900 (5.800) | 4.900 (5.800) | 4.900 (5.800) |
| WAS | TSS 1,000 kg/d | 3.7 | 6.6 | 8.5 | 10.4 | 14.10 | 21.5 |

TABLE 1-continued

Winter (13 deg C.) CMBR Process Assessment - High MLSS Concentration

| | | | CMBR | | | | |
|---|---|---|---|---|---|---|---|
| Parameter | Unit | CSBR (1 Train) | (1 Tr. Upgraded to full BNR Treatment) | (1 Tr. Up- graded + 25% WAS Transfer) | (1 Tr. Up- graded + 50% WAS Transfer) | (1 Tr. Up- graded + 100% WAS Transfer) | (1 Tr. Up- graded + 200% WAS Transfer) |
| Effluent Quality: | | | | | | | |
| TSol. (Bio) COD$_{Cr}$ | mg/L | 21.6 (0.79) | 20.0 (0.64) | 20.5 (0.65) | 21.4 (0.65) | 21.4 (0.66) | 22.3 (0.67) |
| Sol. BOD$_5$ | mg/L | 0.5 | 0.4 | 0.4 | 0.4 | 0.4 | 0.4 |
| NH$_3$ | mg/L | 1.56 | 0.84 | 0.91 | 0.96 | 1.07 | 1.04 |
| Sol. TN | mg/L | 11.9 | 10.4 | 10.5 | 10.6 | 10.6 | 10.7 |
| Sol. TP | mg/L | 0.3 | 0.4 | 0.3 | 0.3 | 0.3 | 0.3 |

TABLE 2

Winter (13 deg C.) CMBR Process Assessment - Low MLSS Concentrations

| | | CMBR | | | | | |
|---|---|---|---|---|---|---|---|
| Parameter | Unit | Low MLSS & SRT 0% WAS Transfer | (1 Tr. Up- graded + 25% WAS Transfer) | (1 Tr. Up- graded + 50% WAS Transfer) | (1 Tr. Up- graded + 100% WAS Transfer) | (1 Tr. Up- graded + 200% WAS Transfer) | (1 Tr. Up- graded + 0% WAS Transfer) |
| Influent Flow | m$^3$/day | 40.000 | 40.000 | 40.000 | 40.000 | 40.000 | 40.000 |
| HRT | hr | 9.5 | 9.5 | 9.4 | 9.3 | 9.2 | 9.5 |
| SRT | day | 7.5 | 5.9 | 4.8 | 3.6 | 2.4 | 8.9 |
| MLSS | mg/L Avg. (Max) | 3.300 (3.900) | 3.300 (3.900) | 3.300 (3.900) | 3.300 (3.900) | 3.300 (3.900) | 3.835 (4.500) |
| WAS | TSS 1,000 kg/d | 7.0 | 8.9 | 10.8 | 14.60 | 22.1 | 6.8 |
| Effluent Quality: | | | | | | | |
| TSol. (Bio) COD$_{Cr}$ | mg/L | 24.2 (0.98) | 21.7 (0.79) | 21.6 (0.77) | 22.0 (0.76) | 23.1 (0.77) | 20.9 (0.71) |
| Sol. BOD$_5$ | mg/L | 0.6 | 0.5 | 0.4 | 0.4 | 0.4 | 0.4 |
| NH$_3$ | mg/L | 31.7 | 16 | 12.8 | 10.6 | 9.1 | 9.4 |
| Sol. TN | mg/L | 35.3 | 22.1 | 19.7 | 18.0 | 17.0 | 17.0 |
| Sol. TP | mg/L | 0.06 | 0.1 | 0.12 | 0.15 | 0.17 | 0.14 |

While this invention has been particularly shown and described with reference to an exemplary embodiment thereof, it will be understood by those skilled in the art that various changes in form and details may be made therein without departing from the spirit and scope of the invention as defined by the appended claims.

The invention claimed is:

1. A sewage and wastewater treatment system using a constant level sequencing batch reactor (CSBR), the system comprising:
    an inner recycle tank;
    an anoxic tank for removing nitrogen by using, as a substrate, both sewage/wastewater introduced from an outside and inner recycle water introduced from the inner recycle tank;
    an anaerobic tank for discharging phosphorous by using, as a substrate, organic matters of both sewage/wastewater introduced from the outside and water introduced from the anoxic tank, and for decomposing the organic matters;
    a first aerobic tank for oxidizing and removing organic matter from water introduced from the anaerobic tank, and performing a nitrification process on organic nitrogen and ammoniacal nitrogen; and
    two main reactor tanks disposed at both sides of a continuous inflow path extending from the inner recycle tank through the anoxic tank to the first aerobic tank and connected to the first aerobic tank, wherein guide rails are disposed on both side inner walls of each of the main reactor tanks, and a partition whose both ends are slidably coupled by the guide rails is provided at each of the main reactor tanks.

2. The system of claim 1, wherein the inner recycle tank and each of the main reactor tanks are connected to each other through a recycle line for recycling the inner recycle water.

3. The system of claim 1, wherein each of the main reactor tanks is divided into a first reactor chamber and a second reactor chamber based on the partition, wherein the first reactor chamber includes a second aerobic tank connected to the first aerobic tank, and wherein the second reactor chamber includes a membrane separator tank connected to the second aerobic tank and including a submerged separation membrane module.

4. The system of claim 3, wherein the inner recycle tank and the second reactor chamber are connected to each other through a recycle line for recycling the inner recycle water.

5. The system of claim 3, further comprising:
    a collection trough disposed at the second reactor chamber and having a hydraulic system for collecting scum, foam and recycled activated sludge and discharging the scum, the foam and the recycled activated sludge.

6. The system of claim 3, wherein the submerged separation membrane module includes a separation membrane having a large pore size of about 10 μm or greater.

7. The system of claim 3, wherein the submerged separation membrane module includes a separation membrane having a minute pore size smaller than about 0.4 μm.

8. A process conversion method in a sewage and wastewater treatment system using a constant level sequencing batch reactor (CSBR), the method comprising:
(1) providing the sewage and wastewater treatment system using CSBR, the system including the inner recycle tank, the anoxic tank, the anaerobic tank, the first aerobic tank, and the two main reactor tanks, all of which are claimed in claim 1;
(2) installing the partition on the guide rails provided at both side inner walls of each of the main reactor tanks to divide each of the main reactor tanks into first and second reactor chambers; and
(3) installing the submerged separation membrane modules at the second reactor chamber.

9. The method of claim 8, wherein the submerged separation membrane module includes a separation membrane having a large pore size of about 10 µm or greater or a separation membrane having a minute pore size smaller than about 0.4 µm.

10. The method of claim 9, wherein when the submerged separation membrane module including the separation membrane having the large pore size is installed, discharged water satisfies water quality criteria that includes a biochemical oxygen demand (BOD) ranging from about 10 to 20 mg/L, a suspended solids (SS) ranging from about 10 to 20 mg/L, a total nitrogen amount ranging from about 20 to 60 mg/L, and a total phosphorous amount ranging from about 2 to 8 mg/L.

11. The method of claim 9, wherein when the submerged separation membrane module including the separation membrane having the minute pore size is installed, discharged water satisfies water quality criteria that includes a biochemical oxygen demand (BOD) ranging from 3 to 10 mg/L, a suspended solids (SS) ranging from 1.0 to 1.5 mg/L, a total nitrogen amount ranging from about 5 to 20 mg/L, and a total phosphorous amount ranging from about 0.2 to 2 mg/L.

12. A sewage and wastewater treatment system using submerged separation membrane modules including separation membranes located in an essentially constant level aerated treatment tank having an air supply system installed therein, the system comprising:
a scum/foam collection trough disposed at the constant level aerated treatment tank and including hydraulic systems for simultaneously collecting scum, foam, and recycled activated sludge from the constant level aerated treatment tank and draining the scum, the foam, and the recycled activated sludge to a collection chamber; and
a pumping system for recycling flows from the collection chamber to an influent tank,
wherein the pumping system has coordinated timing and collection chamber level monitoring systems capable of converting the collection chamber into a variable level scum/foam destruction chamber to change a water level of a collection tank to allow rapid draining of the volume of the scum, foam, and recycled activated sludge from the scum/foam collection trough through flow control systems connected to the collection chamber.

13. A sewage and wastewater treatment method comprising:
by a scum/foam collection trough equipped in an aerated treatment tank, simultaneously and intermittently collecting scum, foam, and recycled activated sludge from the aerated treatment tank with submerged separation membrane modules,
by a PUMP equipped in a collection chamber to allow the collection chamber to have a variable level, lowering a water level of the collection chamber, and
by an adjusting valve, draining the collected scum, foam, and recycled sludge from the scum/foam collection trough to the collection chamber, whereby the collected scum, foam, and recycled sludge are destroyed due to a head drop in the collection chamber having the lowered water level.

14. A sewage and wastewater treatment system using submerged separation membrane modules having a mixed liquor suspended solids (MLSS) concentration required for achieving specified treatment efficiency for wastewater, the system configured to:
receive inflow of waste activated sludge from a first biological treatment system that does not use the submerged separation membrane modules, and
transfer the waste activated sludge received from the first biological treatment system to a second biological treatment system using the submerged separation membrane modules so as to reduce solids retention time (SRT) and scum/foam growth risk of the biological treatment system,
wherein the second biological treatment system includes:
an aerated treatment tank,
a collection chamber,
a scum/foam collection trough equipped in the aerated treatment tank and configured to collect scum, foam, and recycled activated sludge from the aerated treatment tank,
a pump equipped in the collection chamber and configured to lower a water level of the collection chamber, and
an adjusting valve configured to drain the collected scum, foam, and recycled sludge from the scum/foam collection trough to the collection chamber, whereby the collected scum, foam, and recycled sludge are destroyed due to a head drop in the collection chamber having the lowered water level.

\* \* \* \* \*